March 25, 1969
H. E. GOINGS
3,434,650
FOLDABLE TRAY
Filed May 2, 1967
Sheet 1 of 2
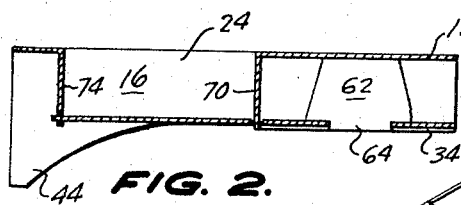
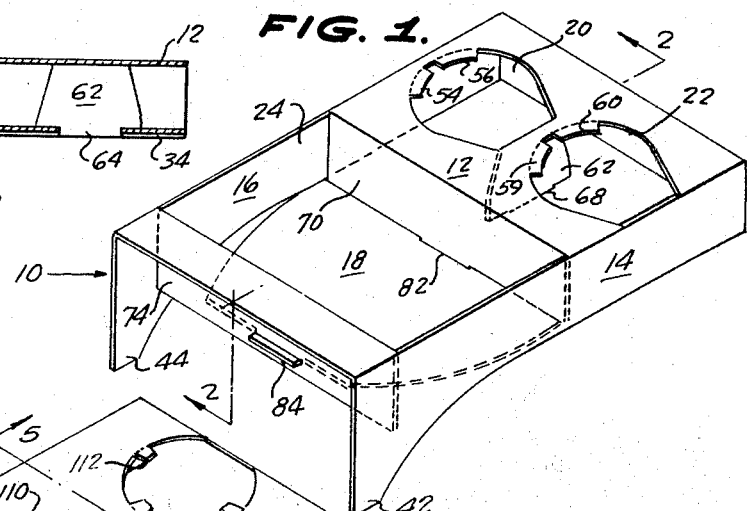
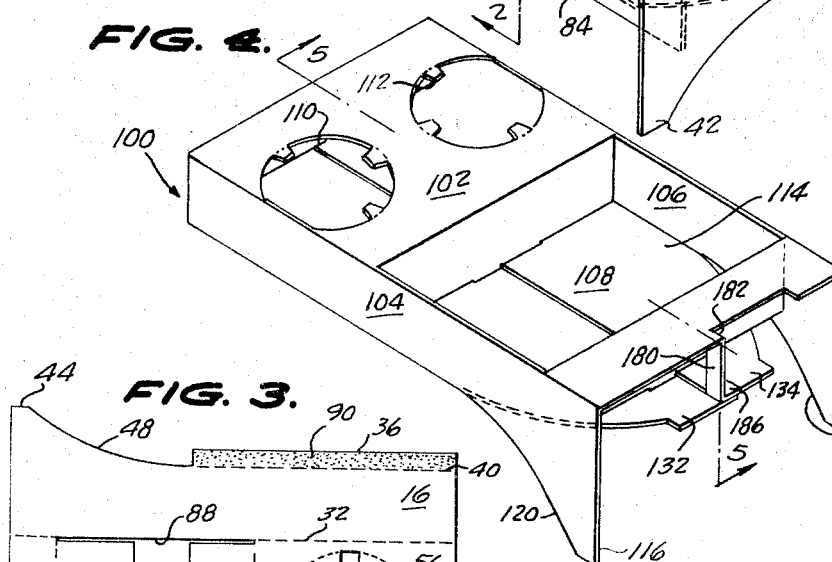
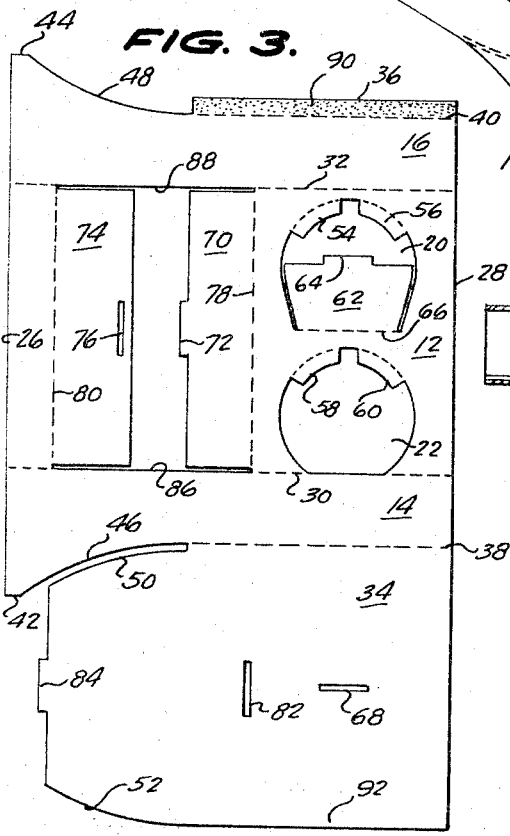
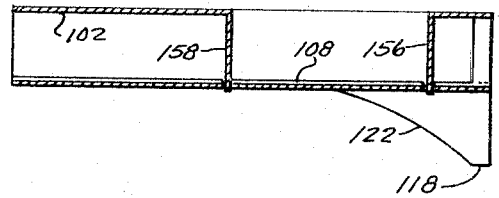
INVENTOR.
HARFORD E. GOINGS,
BY
Kimmel, Crowell & Weaver,
ATTORNEYS.

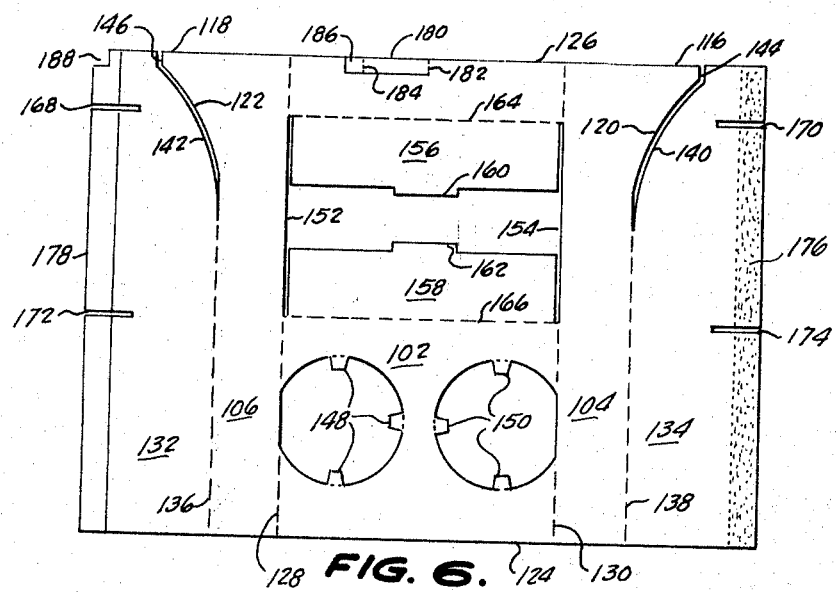
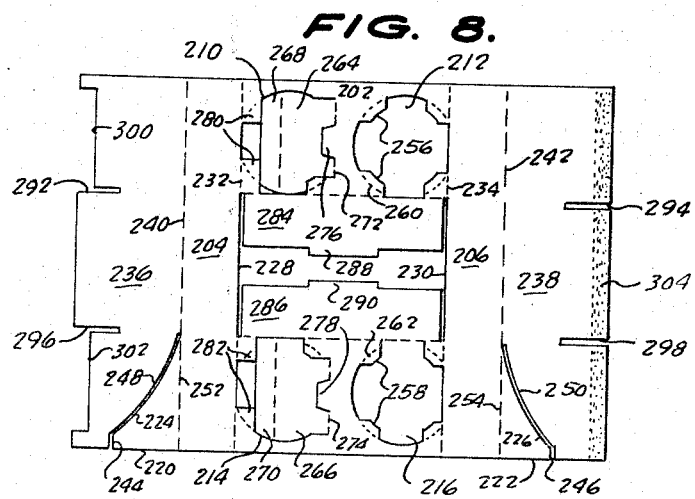
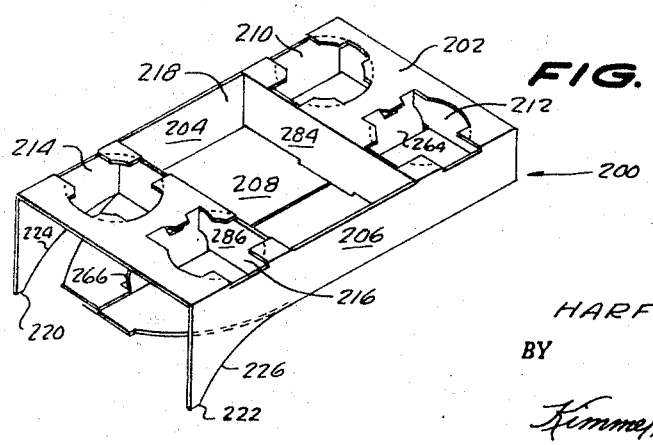

United States Patent Office 3,434,650
Patented Mar. 25, 1969

3,434,650
FOLDABLE TRAY
Harford E. Goings, 5428 Center Drive,
Washington, D.C. 20031
Filed May 2, 1967, Ser. No. 635,432
Int. Cl. B65d 5/48, 1/34
U.S. Cl. 229—28                              9 Claims

ABSTRACT OF THE DISCLOSURE

A tray, and a tray blank having top, bottom and sidewall portions, article receiving openings in the top portion, wall tabs foldably secured to the top portion and engaging the bottom portion and the sidewalls, support tabs foldably secured to the top portion parallel to the sidewalls engaging the bottom portion and sidewall extension portions formed from the bottom portion extending downwardlp below the bottom of the tray for complementarily engaging a curved supporting surface such as a car seat is disclosed.

CROSS-REFERENCE TO RELATED APPLICATIONS

This application and an application filed on the same date herewith, application Ser. No. 635,433 describe inventions which are improvements over the inventions described in my co-pending applications Ser. No. 458,961 filed May 26, 1965, now Patent No. 3,326,445 and application Ser. No. 461,815 filed June 7, 1965, now Patent No. 3,326,446.

BACKGROUND OF THE INVENTION

Field of the invention

This invention relates to car seat trays and more particularly to car seat trays of the type described in my foregoing co-pending applications.

Description of the prior art

In the aforementioned applications Ser. No. 458,961 and Ser. No. 461,815, car seat trays including curved lower edges for complementary engaging curved surfaces such as automobile seats are disclosed. The advantage of such arrangements wherein the tray has a lower portion which is curved to conform with the configuration of a curved surface such as an automobile seat will be apparent from the aforementioned application. However, since trays of the type described in the foregoing applications and in the present application are of the disposable type, that is they are intended to be used but once and disposed of, cost of manufacture is an extremely important item. An unduly complicated tray which required numerous operative or manipulative steps to prepare and assemble it would be so expensive as to preclude any commercial utility. The tray must be easily manufactured, easily stored, and easily assembled for use in order to be of any practical value. Moreover, while material costs are comparatively low since cardboard or fiberboard of some type is generally used in constructing such trays and any unnecessary wastage of such material may increase the overall cost per unit to a point which will effectively preclude commercial development of such trays. It is to overcome this latter problem, primarily, to which the present invention is directed.

SUMMARY

The primary object, then, of this invention is to provide a disposable, foldable tray which may be shipped in the knocked-down or folded condition as a tray blank, easily assembled to form a tray which will securely support articles therein and which may be manufactured and shipped at minimum cost.

An additional object is the provision of a tray blank which may be manufactured from a continuous web of sheet material or from large sheets of substantially rigid sheet material with minimum wastage of such material.

Yet an additional object is the provision of a disposable tray with novel locking means for the components and elements thereof to give the tray a greater degree of rigidity.

A more specific object of the present invention is the provision of a tray blank in which downward extensions are formed on sidewalls, said downward extensions being formed out of bottom portions of the tray.

Other objects and advantages of the present invention will appear from the description and the drawings to which reference is now made.

BRIEF DESCRIPTION OF THE DRAWINGS

FIGURE 1 is a perspective view of an assembled tray viewed from a first end and constructed according to the principle of the present invention.

FIGURE 2 is a side view in cross section taken substantially along lines 2—2 of FIGURE 1 in the direction of the arrows.

FIGURE 3 is a plan view of the blank from which the tray is constructed.

FIGURE 4 is a perspective view of an alternative embodiment of the tray of this invention showing a novel interconnecting means between upper and lower portions thereof.

FIGURE 5 is a side view in cross section taken substantially along lines 5—5 of FIGURE 4.

FIGURE 6 is a flat view of the blank for forming the tray of FIGURE 4.

FIGURE 7 is a perspective view of yet an additional alternative construction of the present invention showing a central tray area and cup engaging areas at each end thereof.

FIGURE 8 is a plan view of the blank from which the tray of FIGURE 7 is constructed.

DESCRIPTION OF THE PREFERRED EMBODIMENTS

Reference is made first to FIGURES 1, 2, and 3. The first embodiment of the container is shown generally at 10 in FIGURE 1. As will be seen, in this embodiment there is provided a top portion 12, sidewall portions 14 and 16, and a bottom portion 18. A plurality of article receiving openings such as 20 and 22 are provided for holding such items as cups, etc. In addition, a tray area is shown generally at 24.

Reference is made now to FIGURE 3 in particular which shows a blank from which the tray may preferably be formed.

It will be understood that such blanks are made of a substantially rigid material such as cardboard, fiberboard, plastic sheeting, or the like. The blank is formed of a single unitary sheet of substantially rigid materials and a plurality of such blanks may be formed from a continuous web or roll of such material or may be formed from a larger sheet of stock material. As will be seen hereinafter, the blanks from which these cartons are made permit highly efficient utilization of stock material.

The top portion 12 has ends 26 and 28 and is defined by score lines 30 and 32 at the side edges thereof. These score lines may be provided by perforations or simply by crushing the material along the lines indicated. The score lines provide a foldable securement for the various elements of the tray. Sidewalls 14 and 16 are secured by such fold scores to the edges of the top portion 12. Similarly, the bottom unit 18 which includes two bottom portions 34 and 36 are secured respectively by fold scores 38 and 40 to the lower edges of the side walls 14 and 16 for foldable relation thereto.

A highly significant and important object and feature of this invention resides in the manner of cutting the bottom unit from the blank. As described in my previous applications, it is highly desirable to provide means such as downward extensions 42 and 44 which are configured, as at the curved portions 46 and 48, to complementarily engage and rest upon a curved surface such as a car seat. In the present invention, these extensions 42 and 44 which extend, when the tray is assembled, below the bottom portion 18 are cut from the bottom unit and more particularly are cut from bottom portion 34 in this embodiment of the invention. Thus, cuts 50 and 52 are generally arcuate to permit the generally arcuate cuts 46 and 48 to be made to provide the extensions 42 and 44 for resting engagement upon a curved car seat.

Before proceeding further with the description of the tray and the blank from which it is made, it will be pointed out that by the present invention it is possible for the fabricator or converter to purchase a single roll of stock material of a width corresponding to the length of the tray, the distance between ends 26 and 28, and to thereby fabricate from such continuous stock, a multiplicity of trays, or more properly tray blanks, with virtually no wastage of material since, as will be seen from FIGURE 3, the curve 52 would fit complementarily with curve 48 and spaced only the width of the narrow bottom portion 36 therefrom. Further inspection reveals that only very small quantities of the material are not used in the tray.

The top portion 12 is provided with a plurality of article receiving openings such as 20 and 22, each of which may be provided with engaging fingers 54 and 56 in opening 20 and 58 and 60 in opening 22. Preferably, at least one of the article receiving openings, such as opening 20, is formed in the space left by a support tab 62 which includes a slot engaging portion 64 and is secured by a fold score 66 to the top portion 12. As will be more completely described hereinafter, the slot engaging portion 64 is adapted to be received in a slot 68 formed in the bottom portion 34 of the bottom unit 18.

There is also provided a pair of opposed wall tabs including a first wall tab 70 which has formed thereon a slot engaging portion 72, and a second wall tab 74 which has formed therein a slot 76. The first wall tab 70 is secured by a fold score 78 to the top portion 12 and the second wall tab 74 is secured by a fold score 80 to the top portion 12 for foldable relation thereto. As will be described more fully hereinafter, the slot engaging portion 72 is adapted to be received in a slot 82 formed in the bottom 34 of bottom unit 18. Similarly, bottom portion 34 is provided with a slot engaging portion 84 which is adapted to be received in slot 76 in wall tab 74.

Thus, it will be seen that an article receiving opening such as a tray area may be formed which is defined by wall tabs 70 and 74 and by the sidewalls 14 and 16 as provided by cuts 86 and 88.

Following the stamping of the stock material to cut out the desired portions and to make the necessary scores, the blank is preferably folded and assembled by gluing to form a unit from which to foldably form a tray. This may be done in a single operation combined with the stamping operation if desired for economical reasons. In forming the unit, the bottom portions 34 and 36 are connected together, preferably in overlapping relation by means such as glue 90 on the bottom portion 36. In forming this unit, the bottom portion 34 is folded at the fold score 38, the side portion 14 is folded at the fold score 30, the side portion 16 is folded at the fold score 32 and the bottom portion 36 is folded at the fold score 40, and the edge 92 of bottom portion 34 is glued to the bottom portion 36 by means of glue 90. When this operation is completed, there is formed a parallel-epipedous open body having open ends which may be folded to a flat position or may, simply by exerting force on the sides, be folded to an expanded generally parallelepipedous construction as shown in FIGURE 1. Support tab 62 is then folded downwardly at fold score 66 and the slot engaging portion 64 thereof is engaged in slot 68. The support tab 62 is parallel to the sidewalls 14 and 16 and lies intermediate thereof.

Walls tabs 70 and 74 are folded downwardly, with the ends thereof engaging, respectively, the sidewalls 14 and 16. Slot engaging portion 72 is received in slot 82 and slot engaging portion 84 is received in slot 76, thereby maintaining the wall tabs 70 and 74 in a vertical upright position engaging the sidewalls 14 and 16 to prevent collapsing of the tray.

It will be apparent from the foregoing that the tray may be manufactured in the form of a tray unit and shipped in the knocked-down or folded condition to point of use thereby utilizing minimum storage and transportation space. At the point of use, a few simple hand manipulations are all that is required to form a rigid sturdy and reliable disposable tray.

Before moving to the second embodiment, it will be pointed out that unusual rigidity is provided in the tray as previously described by the provision of transversely extendig wall tabs 70 and 74 which engage the sidewalls to prevent collapsing of the tray and by the support tab 62 which extends perpendicular to the wall tabs and parallel to the sidewalls. This helps to prevent collapsing of the tray and, very importantly, supports the cup carrying portion of the tray, adjacent article receiving openings 20 and 22, so as to prevent collapse of the tray when cups are inserted therein.

Reference is made now to FIGURES 4, 5 and 6, which show an improved and preferred embodiment of the present invention.

In this embodiment, the tray 100 comprises a top portion 102, side portions 104, 106 and a bottom unit 108. The tray is provided with a plurality of article receiving openings therein shown at 110 and 112 and a tray area shown at 114. The tray also includes a pair of downwardly extending projections 116 and 118 which include curved portions 120 and 122 for complementarily fitting on a curved support surface such as an automobile seat.

Reference is made to FIGURE 6 which shows a blank for forming the tray of FIGURE 4. The top portion of of the blank 102 includes ends 124 and 126, which as previously described with respect to the first embodiment, may comprise the sides of a web or of a stock sheet. The sides of the top portion 102 are formed by fold scores 128 and 130 which foldably interconnect sidewalls 106 and 104 to the top portion 102. Similarly, the bottom unit which comprises bottom portions 132 and 134 are connected by fold scores 136 and 138 which, as previously described, may be perforations or crushed portions of the substantially rigid sheet material of which the tray is formed.

As in the previous embodiment, a highly important feature of this invention is the provision of extensions 116 and 118 which are formed of the bottom portions 134 and 132 by a generally arcuate cut 140 in bottom portion 134 and 142 in bottom portion 132. The extensions also include square portions 144 and 146 for greater strength and stability.

A plurality of cup-engaging fingers 148, in opening 102, and 150, in opening 104, are provided for gripping the cup to hold it in a stable upright position. If desired, these fingers may be secured by fold scores in the usual manner to the top portion 102.

A tray area is formed by cuts 152 and 154 at the edges of the top portion and by wall tabs 156 and 158, which include slot engaging portions 160 and 162, and are secured by fold scores 164 and 166 to the top portion 102.

As will be described in greater detail, the slot engaging portions 160 and 162 are receivably engaged in slots 168 and 170 and slots 172 and 174, respectively, in the bottom portions 132 and 134.

Before describing the next step in the formation of the tray, it will be noted that the blank is substantially rectangular in shape and there is virtually no waste produced in the formation of the blank. Thus, it is possible for the converter to purchase rolls of stock and produce a multiplicity of tray blanks therefrom or to produce rectangular stock and stamp blanks therefrom with essentially no waste of material. This savings results in large part by forming the extensions 116 and 118 out of the bottom portions 132 and 134.

A tray unit is formed by folding the blank at the fold scores 128, 130, 136 and 138 and overlapping the glued area 176 with the edge area 178 of the bottom portions 134 and 132 respectively. Of course, any fastening means may be used in place of the glue.

An important feature of this embodiment of the invention resides in the provision of an additional support tab 180 best shown in FIGURE 4. Tab 180 is formed from the top portion 102 and is secured thereto by a fold score 182 and includes therein a second fold score 184. A foot portion 186 is formed by the second fold score 184 and is received in notch 188, best shown in FIGURE 6, in the bottom portion 132. The same glue line, 176, which secures the edge 178 of bottom portion 132 to bottom portion 134 also secures the foot portion 186 of the tab 180 to the bottom portion 134.

The tab 180 serves a very important function as will be described hereinafter.

The tray square may be folded flat and stored or shipped in that position to the point of use.

At the point of use, it is necessary only to exert minimal manual force on the edges of the tray unit to expand it to the parallelepipedous form shown in FIGURE 4. The slot engaging portions 160 and 162 of wall tabs 156 and 158 are engageably received in a slot formed by individual slots 168 and 170 and by slots 172 and 174 respectively. It will be noted that the glue line is substantially centrally disposed in the bottom of the tray providing a double thickness in the slot area. This double thickness increases the strength and rigidity of the assembled tray. The strength and rigidity is further increased by the provision of the tab 180 which is the distance between top portion 102 and the bottom portion 108 and secures the bottom portion upwardly against the downward force exerted by the wall tabs 156 and 158. It will also be noted that the wall tabs 156 and 158 engage the side walls 104 and 106 to prevent collapsing of the expanded tray. The resilient bias force exerted upwardly by the tab 180 at one end of the tray and the upward force exerted by the sidewalls 104 and 106 at the other end of the tray maintain the tray in substantially rigid parallelepipedous open body configuration.

Reference is made now to FIGURES 7 and 8 which show, in reduced scale, yet another embodiment of the present invention which has been found highly successful and advantageous.

The tray 200 of this embodiment comprises a top portion 202 sidewalls 204 and 206 and a bottom unit 208. A plurality of cup receiving openings 210, 212, 214 and 216 are provided disposed, respectively, in pairs at the ends of the tray. A tray area 218 is disposed centrally on the tray. As previously described, a pair of extensions 220 and 222 with curved portions 224 and 226 are provided for complementarily engaging a curved surface such as a car seat.

Reference is now made particularly to FIGURE 8 which shows a blank for forming the tray. At the outset, it will be noted that the blank is substantially rectangular and that, as is true of the previous embodiments, there is substantially no waste of material.

The top portion is cut as shown at 228 and 230 adjacent the edges thereof, which are defined by fold scores 232 and 234. The sidewalls 204 and 206 are secured by the fold scores 232 and 234 to the top portion 202 and the bottom unit made up of bottom portions 236 and 238 are secured by fold scores 240 and 242 to the sidewalls 204 and 206. The extensions 220 and 222 which include generally arcuate portions 224 and 226 as well as flat portions 244 and 246 are cut from the bottom portions 236 and 238 by cuts 248 and 250 respectively. It will be noted that, in this embodiment, scores 252 and 254 are shown extending above the extensions 220 and 222. These scores may be omitted or they may be included to permit the extensions conveniently to be folded into the bottom portion if it is desired to place the tray on a flat surface. Similarly, such scores may be provided in the foregoing embodiments but are not shown for purposes of clarity.

In the forming the blank, openings 212 and 216 are punched out leaving fingers 256 and 258 secured to the top portion 202 by fold scores 260 and 262 in the manner disclosed.

An important feature resides in the provision of support tabs 264 and 266 which include a foot portion 268 and 270, respectively, on each of the tabs. The tabs 264 and 266 are secured to the top portion 202 by fold scores 272 and 274, which also define fingers 276 and 278. Additional fingers, such as fingers 280 and 282 may be provided in a similar manner. Thus it will be seen that the tabs 264 and 266 form article receiving openings 210 and 214. Wall tabs 284 and 286, including slot engaging portions 288 and 290, are formed and define, along with the sidewalls 204 and 206, a generally centrally disposed tray area. The wall tabs 284 and 286 engage the side walls 204 and 206 to prevent the tray from collapsing as will be described in greater detail hereinafter. The slot engaging portions 288 and 290 are adapted to be received in slots formed by the individual slots 292 and 294 and by slots 296 and 298. Notches 300 and 302 are provided in the bottom portion 236 for receiving the foot portion 268 and the foot portion 270, respectively, of tabs 264 and 266 as will be described.

In completing the tray unit, which is folded, stored and shipped to the point of use, the blank is folded at the fold scores 232, 234, 240 and 242 and the glue area 304 on bottom portion 238 is placed in overlying relation with the edge of bottom portion 236. Of course, staples or any convenient fastener may be used. It will be noted that during this assembly operation, the same glue line 304 is used to secure the foot 268 of tab 264 and the foot 270 of tab 266 thereto. Thus, there is formed a tray unit which may be folded to a thickness of two sheets and which, merely by exerting a small manual force on the edges of the unit may be converted into an open parallelepipedous configuration as shown in FIGURE 7. The wall tabs 284 and 286 engage the sidewalls 204 and 206 to prevent collapse of the tray. In addition, support tabs 264 and 266 prevent collapse of the tray and vertically support the area adjacent the cup receiving openings. Importantly, also, the tabs 264 and 266 support the bottom portion 208 of the tray biasingly upwardly against the wall tabs 284 and 286 to maintain the slot engaging portions 288 and 290 rigidly in engagement in the slots formed by the individual slots 292 and 294 and slots 296 and 298. With regard to these slots, it will be noted that a double thickness of material is provided centrally of the tray which more securely receivably engages the slot engaging portions 288 and 290. Thus, the strength and rigidity of the tray is increased by the careful selection of the position of the overlapping area, the construction of the wall tabs which engage the sidewalls and the construction of the support tabs which support the bottom portion upwardly against the wall tabs.

In addition to being extremely rigid and sturdy, as previously pointed out, there is very little wastage in the production of such trays and such trays may be produced either from a continuous web of stock material or from individual rectangular pieces of such material.

Now, it will be realized that while the invention has been abstracted, summarized and disclosed with reference to specific embodiments, specific instructions, specific configuration and showing the details in great specificity that the disclosure is for the purpose of teaching those skilled in the art of practice the invention and is exemplary of the invention and not intended in the limiting sense. Accordingly, it is intended and expected that the scope of the invention will be defined and limited only by the scope of the appended claims.

I claim:

1. A tray comprising:
   a top member having article receiving openings therein;
   opposed side walls foldably secured to the top member;
   an underlying bottom portion foldably secured to the side walls;
   said side walls each including a portion formed from the bottom portion which extends downwardly below the bottom portion for generally conforming to a curved configuration of a supporting surface;
   a pair of wall tabs foldably secured to the top member for engaging the side walls at the ends of said tabs and the bottom unit for defining a tray area;
   the first of said wall tabs being engaged by the end of the bottom portion; and
   the second of said wall tabs engaging the bottom portion at the edge of said second tab.

2. The tray of claim 1 further comprising:
   a support tab foldably secured to the top member, said tab lying in a plane parallel to the sidewalls and disposed therebetween for engagement with the bottom unit.

3. The tray of claim 2 further comprising means securing an end of the support tab to the bottom unit.

4. A tray comprising:
   a top member having article receiving openings therein;
   opposed side walls foldably secured to the top member;
   an underlying bottom portion foldably secured to the side walls;
   said walls each including a portion formed from the bottom portion which extends downwardly below the bottom portion for generally conforming to a curved configuration of a supporting surface;
   a pair of wall tabs foldably secured to the top member for engaging the side walls at the ends of said tabs and the bottom portion for defining a tray area;
   said bottom portion including partially overlapping bottom members, said bottom members being respectively foldably secured to the side walls, said portions extending downwardly below the bottom portion being formed respectively from the bottom members; and
   said bottom portion including at least one slot formed in the overlapping portion for receivingly engaging the edges of the wall tabs.

5. A tray blank for foldably forming a tray, said tray blank being formed of unitary substantially rigid sheet material, comprising:
   a top portion having article receiving openings therein;
   sidewall portions secured by fold scores along the sides of the top portion;
   bottom portions secured by fold scores to the sidewall portions;
   means securing the bottom portions together in overlapping relation to form a foldable parallelpipedous open body;
   opposed wall tabs secured by fold scores to the top portion and extending transversely to engage the sidewall portions to define a tray area;
   at least one support tab secured by a fold score to the top portion, said support tab being parallel to the sidewall portions and disposed for engagement with at least one of the bottom portions;
   said overlapping bottom portions having slots extending therethrough;
   at least one of said wall tabs having a slot engaging portion adapted for engagement with a slot in said overlapping bottom portions; and
   said support tab having a slot engaging portion adapted for engagement with the slot in said bottom portions.

6. The tray blank of claim 5 wherein:
   at least one wall tab is provided with a slot for receiving at least one bottom portion for fixing the distance from the top portion to the bottom portion.

7. The tray blank of claim 6 further comprising:
   side wall extension portions formed from the respective bottom portions extending downwardly below the bottom of the tray for complementarily engaging a curved supporting surface such as a car seat.

8. The tray blank of claim 6 wherein:
   the support tab is formed from the top portion so as to provide an article receiving opening adjacent said support tab.

9. A tray comprising:
   a top member having article receiving openings therein;
   opposed side walls foldably secured to the top member;
   an underlying bottom portion foldably secured to the side walls;
   said side walls each including a portion formed from the bottom portion which extends downwardly below the bottom portion for generally conforming to a curved configuration of a supporting surface;
   a pair of wall tabs foldably secured to the top member for engaging the side walls at the ends of said tabs perpendicularly thereto and a bottom portion for defining a tray area;
   said bottom portion having slots formed therein;
   a slot engaging portion formed on at least one of said wall tabs for engaging in one of the slots in said bottom portion; and
   a support tab foldably secured to the top member, said tab lying in a plane parallel to the side walls and disposed therebetween for engagement with the bottom portion, said support tab having a slot engaging portion formed on the edge engaging said bottom portion with said slot engaging portions engaging in one of said slots in said bottom portion.

References Cited

UNITED STATES PATENTS

| | | | |
|---|---|---|---|
| 2,640,589 | 6/1953 | Foster et al. | 229—28 XR |
| 2,695,712 | 11/1954 | Kolander. | |
| 2,875,940 | 3/1959 | Dunn | 229—30 |
| 3,009,623 | 11/1961 | Wenzel | 229—28 |
| 3,181,770 | 5/1965 | Coe | 229—30 |
| 3,253,766 | 5/1966 | Coe | 229—28 |
| 3,326,445 | 6/1967 | Goings. | |
| 3,326,446 | 6/1967 | Goings. | |

DAVIS T. MOORHEAD, *Primary Examiner.*

U.S. Cl. X.R.

206—72